US008949590B2

(12) United States Patent
Russell et al.

(10) Patent No.: US 8,949,590 B2
(45) Date of Patent: Feb. 3, 2015

(54) CONTROLLING ACCESS TO SOFTWARE COMPONENT STATE

(71) Applicant: Microsoft Corporation, Redmond, WA (US)

(72) Inventors: Christopher D. Russell, Duvall, WA (US); Eric P. Traut, Bellevue, WA (US); Ravisankar Pudipeddi, Bellevue, WA (US); Adam D. Stritzel, Redmond, WA (US); Suyash Sinha, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 42 days.

(21) Appl. No.: 13/866,970

(22) Filed: Apr. 19, 2013

(65) Prior Publication Data
US 2014/0019954 A1 Jan. 16, 2014

Related U.S. Application Data

(63) Continuation of application No. 12/483,465, filed on Jun. 12, 2009, now Pat. No. 8,429,395.

(51) Int. Cl.
*G06F 9/00* (2006.01)
*G06F 9/44* (2006.01)

(52) U.S. Cl.
CPC ........................................ *G06F 8/71* (2013.01)
USPC ............................ 713/100; 717/170; 717/168

(58) Field of Classification Search
USPC .................... 717/170, 168; 713/100
See application file for complete search history.

(56) References Cited

U.S. PATENT DOCUMENTS

| 6,119,131 | A | 9/2000 | Cabrera |
| 6,161,176 | A | 12/2000 | Hunter et al. |
| 6,359,634 | B1 | 3/2002 | Cragun et al. |
| 6,538,668 | B1 | 3/2003 | Ruberg et al. |
| 6,560,699 | B1 | 5/2003 | Konkle |
| 6,732,354 | B2 | 5/2004 | Ebeling et al. |
| 6,735,691 | B1 | 5/2004 | Capps et al. |
| 7,028,173 | B2 | 4/2006 | Shizuka et al. |
| 7,158,984 | B2 | 1/2007 | Fairweather |
| 7,346,634 | B2 | 3/2008 | Fedorov |
| 7,353,502 | B2 * | 4/2008 | Stewart et al. ................ 717/136 |

(Continued)

FOREIGN PATENT DOCUMENTS

| CN | 1973262 | 5/2007 |
| CN | 101371250 | 2/2009 |

OTHER PUBLICATIONS

"Foreign Office Action", CN Application No. 201080026014.0, Apr. 23, 2014, 14 Pages.

(Continued)

*Primary Examiner* — Krisna Lim
(74) *Attorney, Agent, or Firm* — Timothy Churna; Kate Drakos; Micky Minhas

(57) ABSTRACT

A request is received from a software component of a software product to access a value of a public setting of the software component. A check is made as to whether the request conforms to an appropriate format for the public setting. If the request conforms to the appropriate format, then the requested access is performed. However, if the request does not conform to the appropriate format, then the requested access is denied. Multiple values for the public setting can be received and maintained concurrently.

20 Claims, 7 Drawing Sheets

(56) References Cited

U.S. PATENT DOCUMENTS

| | | | |
|---|---|---|---|
| 7,386,885 | B1 | 6/2008 | Kaspersky et al. |
| 7,949,995 | B2 | 5/2011 | Sadlek |
| 8,024,732 | B2 | 9/2011 | Sheehan et al. |
| 8,140,475 | B1 | 3/2012 | Sparks |
| 8,429,395 | B2 | 4/2013 | Russell et al. |
| 2003/0028856 | A1 | 2/2003 | Apuzzo et al. |
| 2003/0131152 | A1 | 7/2003 | Erlingsson |
| 2003/0159028 | A1 | 8/2003 | Mackin |
| 2005/0278701 | A1 | 12/2005 | Buskens et al. |
| 2006/0069909 | A1 | 3/2006 | Roth et al. |
| 2006/0174319 | A1 | 8/2006 | Kraemer et al. |
| 2007/0113069 | A1 | 5/2007 | Gentil et al. |
| 2008/0147698 | A1 | 6/2008 | Gustafsson et al. |
| 2009/0172384 | A1 | 7/2009 | Anson |
| 2010/0319050 | A1 | 12/2010 | Russell |

OTHER PUBLICATIONS

"Foreign Office Action", CN Application No. 201080026014.0, Dec. 17, 2013, 10 pages.

"Foreign Office Action", Chinese Application No. 201080026014.0, (Jun. 19, 2013), 11 pages.

"An Examination of Operating System Support for Persistent Object Systems", Retrieved from <http://ieeexplore.ieee.org/stamp/stamp.jsp?arnumber=00183232__>, (1992), pp. 779-788.

"Chapter 10: Customization and Persistence", Retrieved from <http://www.codeplex.com/TextEdit/Wiki/View.aspx?title=Chapter%2010%20%u2014%20Customization%20and%20Persistence&referringTitle=Home>on Apr. 2, 2009, 8 pages.

"Data Persistence with the RAM-based Registry Using the OAL", Retrieved from <http:msdn.microsoft.com/en-us/library/ms892394.aspx> on Apr. 2, 2009, 1 page.

"Data Store and Registry", Retrieved from <http://msdn.microsof.com/en-us/library/ms923352.aspx> on Apr. 2, 2009, 2 pages.

"Final Office Action", U.S. Appl. No. 12/483,465, (Nov. 8, 2012), 6 pages.

"Mac OS X v10.4: Non-Standard Persistent Attributes", Retrieved from <http://developer.apple.com/documentation/Cocoa/Conceptual/CoreData/Articles/cdZ104NSAttributes.htm>, (Mar. 4, 2009), 8 pages.

"Non-Final Office Action", U.S. Appl. No. 12/483,465, (May 31, 2012), 10 pages.

"Notice of Allowance", U.S. Appl. No. 12/483,465, (Dec. 20, 2012), 6 pages.

"PCT Search Report and Written Opinion", Application No. PCT/US2010/038349, (Dec. 28, 2010), 9 pages.

"Foreign Office Action", CN Application No. 201080026014.0, Sep. 3, 2014, 12 Pages.

* cited by examiner

CONTROLLING ACCESS TO SOFTWARE COMPONENT STATE

RELATED APPLICATIONS

The application claims priority under 35 U.S.C. Section 120 as a continuation of U.S. patent application Ser. No. 12/483,465, filed Jun. 12, 2009, and titled "Controlling Access to Software Component State," the entire disclosure of which is incorporated by reference.

BACKGROUND

A computer typically runs an operating system that provides various functionality including allowing other applications to be installed and run on the computer. Such an operating system oftentimes provides a location where applications can store various types of information to be persisted across multiple executions of the applications. This location could be, for example, an operating system registry. While maintaining such information can be beneficial to the applications, current storage mechanisms are not without their problems. One such problem is that different applications typically interact with the same location, allowing situations to arise where information stored by one application is deleted, overwritten, or otherwise corrupted by another application. Such situations can result in applications not running as intended, or even failing to run at all.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request is received from a software component of a software product to access a value of a setting of the software component. Such settings are, for example, configuration information that the software component desires to store in a manner that persists beyond the runtime of the software so that subsequent activations of the software may read the persistent information and re-establish the configuration. A check is made as to whether the request conforms to an appropriate format for the setting. If the request conforms to the appropriate format, then the requested access is performed. However, if the request does not conform to the appropriate format, then the requested access is denied.

In accordance with one or more aspects, a setting declaration for a software component is received. The setting declaration identifies an appropriate format for accessing a declared setting. A record of the setting declaration is maintained. Multiple values for the declared setting are also received, and the multiple values are concurrently maintained.

BRIEF DESCRIPTION OF THE DRAWINGS

The same numbers are used throughout the drawings to reference like features.

DETAILED DESCRIPTION

Controlling access to software component persistent settings is discussed herein. These settings are persisted across different executions of the software component. A software product is made up of one or more software components, each of which can communicate with a setting storage control module. The setting storage control module controls access to at least some of the persistent state associated with software components. The software component can store one type of persistent settings (referred to as public settings) to which the setting storage control module controls access. The software component can also store other types of persistent settings or information (referred to as private state). In both the public settings and private state cases, the location where a software component's persistent state data is stored is controlled. In the case of public settings, the structure and type of data is constrained by the storage control module per constraints imposed by the software component's declared setting schema. In the case of private state, the software component itself determines the structure and type of the data but not the location where the data is actually stored.

The particular public settings that may be accessed by a particular software component are declared in a settings schema which is part of a software component's immutable manifest. The setting storage control module constrains each software component to access only the public settings that the software component has declared in the settings schema; other requests to access public settings from the software components are rejected by the setting storage control module.

Additionally, the setting storage control module can maintain and allow access to multiple different values for each setting. When a setting value is written, the location where the setting value is stored can be dependent on the identity of the writer of the value. Accordingly, different components, modules, devices, and so forth can have different setting values stored and persisted concurrently for the same setting. An algorithm or a set of rules can be used to identify which of those different setting values is to be returned in response to a request for the value of a particular setting.

Figure 1:
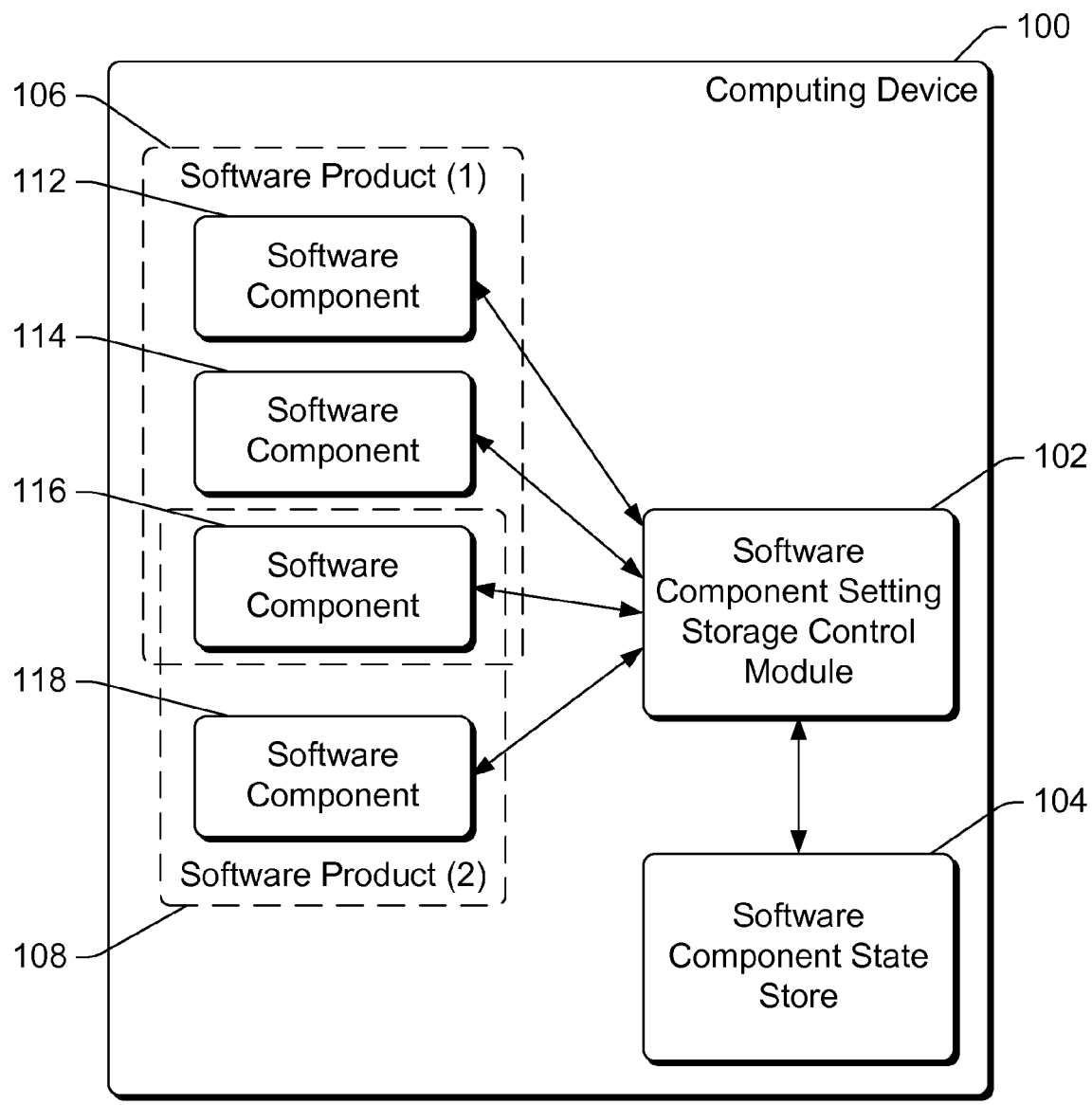
FIG. 1 illustrates an example computing device implementing the controlling access to software component state in accordance with one or more embodiments.

FIG. 1 illustrates an example computing device 100 implementing the controlling access to software component state in accordance with one or more embodiments. Computing device 100 can be a variety of different devices capable of running applications. For example, computing device 100 can be a desktop computer, a server computer, a laptop computer, a mobile station, an entertainment appliance, a set-top box communicatively coupled to a display device, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, handheld game consoles).

Computing device 100 includes a software component setting storage control module 102 and a software component state store 104. Two software products 106 and 108, also referred to as software applications, are illustrated as being included in computing device 100. Although two software products 106 and 108 are illustrated in the example of FIG. 1, alternatively fewer than two or more than two software products can be included in computing device 100. Each software product 106 and 108 includes one or more software components. In the example of FIG. 1, software product 106 includes software component 112, software component 114, and software component 116, while software product 108 includes software component 116, and software component 118. As can be seen in FIG. 1, multiple different software products can share a software component (e.g., software component 116).

Component software setting storage control module 102 manages the storage of, and access to, at least some settings in software component state store 104 for software components 112-118. These settings are configuration information for software components 112-118 that are persisted by control module 102 across different executions of the software components 112-118. Multiple different settings can be managed by control module 102 for each software component 112-118. Each of these different settings has a setting identity and one or more setting values as discussed in more detail below. The specific settings that are stored by software components 112-118 and how software components 112-118 use these settings is determined by the developers of the individual software components 112-118. However, the storage of the setting's value or values is controlled and managed by control module 102.

As can be seen in FIG. 1, each software product is comprised of one or more software components. The software components of a software product include instructions and data that can be run on computing device 100, and together the software components provide the functionality of the software product. Accesses to control module 102 are made by software components when running, rather than by the software product as a whole.

Figure 2:
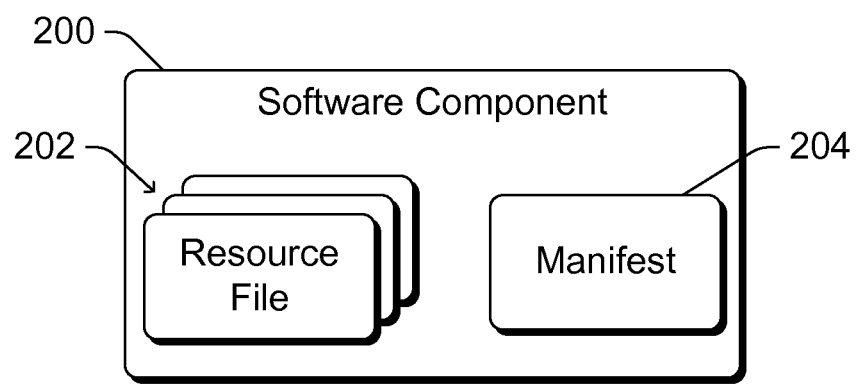
FIG. 2 illustrates an example software component in accordance with one or more embodiments.

FIG. 2 illustrates an example software component 200 in accordance with one or more embodiments. A software component is a collection of both one or more files and metadata that describes the software component. Software component 200 includes one or more resource files 202 each storing various instructions and/or data for the software component 200. The particular resource files 202 that are included in software component 200 can vary based on the desires of the developer of software component 200.

Manifest 204 stores metadata describing software component 200. In one or more embodiments, manifest 204 includes an identifier of software component 200, one or more version numbers of software component 200, and one or more public setting declarations (referred to collectively as the "settings schema") for software component 200. The identifier of software component 200 allows software component 200 to be distinguished from other software components installed on the device. The identifier can be generated in a variety of different manners, such as based on the name assigned by the developer of software component 200, an identifier of the developer of software component 200, an identifier of the publisher or distributor of software component 200, the version number of software component 200, and so forth.

The version number of software component 200 allows different versions of software component 200 to be readily identified. In one or more embodiments, two different version numbers are included in manifest 204: a contract version number and a servicing version number. Alternatively, the contract version number and servicing version number can be combined together into a multi-element number with one or more elements being the contract version number and one or more elements being the servicing version number. These version numbers can be used to facilitate upgrading of software component 200 while maintaining previous state settings in certain situations as discussed in more detail below.

The public settings schema declared in manifest 204 defines the name, data type and default value of each of one or more public settings leveraged by the software component. Each public setting declaration in the schema is leveraged by the storage control manager to insure that software component runtime access to that specific setting is in the correct format (verification of the correct format is one of the responsibilities of the storage control module 102 of FIG. 1). The values (e.g., default value, the software value written by a software component, and policy override values, discussed in more detail below) associated with each declared public setting are persisted across different executions of software component 200. For example, execution of software component 200 can be terminated and subsequently restarted, and when restarted the stored values for the settings of software component 200 can be retrieved, allowing software component 200 to have the same settings with the same setting values as before execution was terminated.

A specific setting declared in the setting schema is declared with one of several operating system-defined low-level data types such as integer, string, Boolean, etc. Multiple settings may be declared in the settings schema in order to represent more complex data types as composites of this set of primitive data types. For example, public settings may be declared to represent information such as screen locations (e.g. identifying where parts of a user interface are to be displayed), font sizes and/or typefaces, language preferences, default storage locations, volume level preferences, enabling or disabling a particular input devices, and so forth.

It should be noted that the setting for which values are stored by software component 200 refers to software state rather than user data. Software state refers to data having a location and lifetime that is managed by the operating system (or alternatively by another application), even if the value of the software state can be changed in response to a user request. User data, on the other hand, refers to data files having a location and lifetime that is managed explicitly by the user (e.g., particular document files, picture files, music files, and so forth).

Software component 200 can store public settings and/or private state. Private state refers to unschematized information whose structure and data type is determined by the software component's implementation (i.e., private state is not schematized in a setting declaration). Private state and its storage are discussed in more detail below.

Public settings, on the other hand, refer to state that is managed by a software component setting storage control module (such as module 102 of FIG. 1). Manifest 204 includes a setting declaration for each public setting, identifying a setting identity, a type of information stored for the setting, and optionally a default value for the setting.

In one or more embodiments, a public setting declaration in manifest 204 includes three elements: a name, a type, and a default value. The name specifies a moniker that identifies the public setting, distinguishing the public setting from other public settings used by software component 200. The type identifies the data type (e.g., the size, format and semantics used to store a specific value) for a public setting. A variety of different setting types can be supported, such as integers, Boolean values, character strings, date and/or time values, references to files or directories, and so forth. The default value identifies the default value for the public setting as defined by the developer of software component 200. This default value is maintained even though the value of the setting can be subsequently changed as discussed in more detail below. In one or more embodiments each setting has a default value, although a default value of an empty string, a value of "null" or zero, and so forth can be used. In other embodiments, no default value may be provided by the developer.

Returning to FIG. 1, each software component 112-118 can maintain private state and/or public settings. Each software component 112-118 can store whatever data or information it desires and is not constrained to pre-declaring its private state to control module 102. However, the location of private state data is controlled by the operating system. Storage control module 102, or alternatively another component or module of the operating system of computing device 100, provides each software component with one or more locations in the file system hierarchy or other registration store in which it can store its private state.

Public settings on the other hand refer to settings that are managed by storage control module 102. Each software component 112-118 pre-declares the particular settings it desires to have module 102 maintain as public settings. This pre-declaring is done, for example, using the public settings declarations of the manifest as discussed above. The public settings declarations are pre-declared to module 102 before a running software component attempts to access the public settings.

The pre-declaring of public settings provides control module 102 with the exact specification of the appropriate format for those settings. By pre-declaring its public settings, a software component is constrained to access only the public settings that are pre-declared. For example, the state is constrained by control module 102 to having a name as pre-declared, having a setting type as pre-declared, and having a default value as pre-declared.

Figure 3:
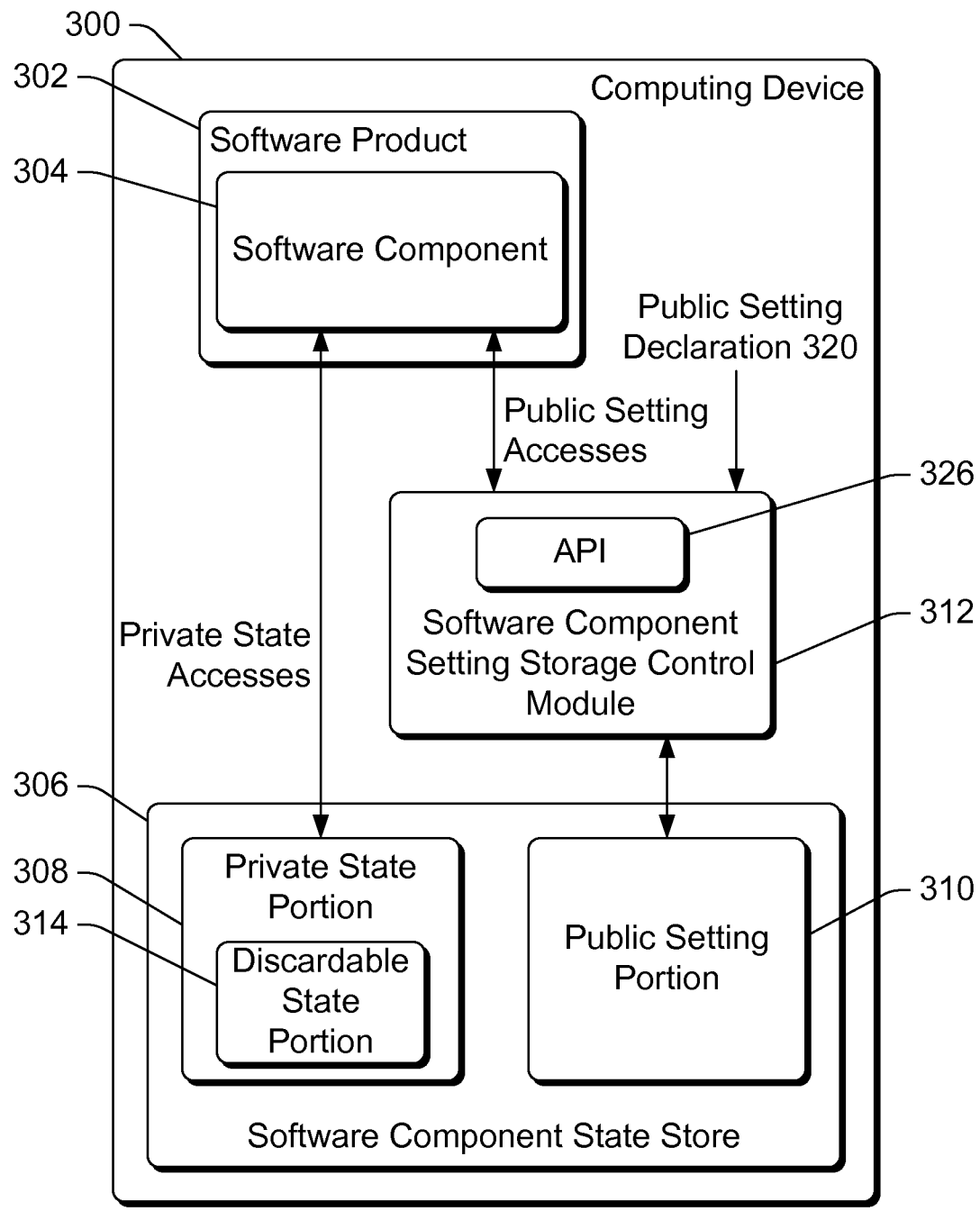
FIG. 3 illustrates an example computing device implementing controlling access to software component setting values in accordance with one or more embodiments.

FIG. 3 illustrates an example computing device 300 implementing controlling access to software component setting values in accordance with one or more embodiments. Computing device 300 can be, for example, a computing device 100 of FIG. 1. For ease of explanation, a software product 302 having a single software component 304 is illustrated in FIG. 3. It is to be appreciated, however, that multiple software components can be included in a software product as discussed above.

Software component 304 can store public setting values and/or private state in software component state store 306. Software component state store 306 can be, for example, store 104 of FIG. 1. A private state portion 308 of store 306 stores arbitrary information at the discretion of the software component developer in a location determined by the operating system of computing device 300, while the public setting portion 310 of store 306 stores public setting values. Software component 304 can access private state portion 308 directly, saving, retrieving, and otherwise accessing private state as desired in the location specified by the operating system of computing device 300. The software component 304 can be informed of this location by the operating system, or alternatively the location can be abstracted by the operating system and the software component can access private state portion 308 via one or more application programming interface (API) methods exposed by the operating system.

However, software component 304 accesses public setting portion 310 via software component setting storage control module 312. Control module 312 is typically implemented as part of an operating system running on computing device 300, although control module 312 can alternatively be implemented as a separate module or component. Accordingly, requests from software component 304 to save, retrieve, or otherwise access public setting portion 310 are performed to store 306 by module 312 rather than directly by software component 304. Control module 312 can be, for example, control module 102 of FIG. 1.

The name of a public setting used by software component 304 identifies the public setting to storage control module 312 and allows module 312 to distinguish the public setting from other public settings used by software component 304. Module 312 leverages the settings schema to validate the named public setting as discussed above. This name of the public setting used by software component 304 can be the name of the setting as declared in the settings schema, or alternatively can be another name associated with the name of the setting as declared in the settings schema and/or a more complex moniker to accommodate more complex type systems for public settings.

Private state portion 308 also optionally includes a discardable state portion 314. Discardable state portion 314 stores private state that is deemed to be of low value and can be deleted while maintaining the proper operation of software component 304. In one or more embodiments, discardable state portion 314 stores private state that can be readily re-determined after having been deleted from store 306. For example, software component 304 may use discardable state portion 314 as a type of performance cache, storing information (e.g., intermediate results of a lengthy calculation) that software component 304 calculates or obtains from some other software component. The performance of software component 304 can be improved by retrieving the information from discardable state portion 314 rather than re-calculating or re-obtaining the information each time software component 304 desires to use the information. However, if discardable state portion 314 were to be deleted, the information could still be re-calculated or re-obtained, maintaining the proper operation of software component 304.

Having a discardable state portion 314 can facilitate various different usage scenarios. For example, multiple different reset levels can be employed, as discussed in more detail below, one of which can be the deletion of the private state in discardable state portion 314. By way of another example, when reclaiming of storage space is desired, the information in discardable state portion 314 can be deleted and discardable state portion 314 can be reclaimed for other uses.

Software component setting storage control module 312 or another component or module of the operating system of computing device 300 controls software component state store 306. This control includes the location of store 306 (e.g., the particular storage device or devices, particular file system paths, etc.) as well as the manner in which store 306 is organized (e.g., using a file system hierarchy, table, list, etc.).

Software component state store 306 can be implemented in a variety of different manners. For example, store 306 can be implemented using a file system hierarchy (e.g., as discussed in more detail below with reference to FIG. 4), using one or more tables, one or more databases, one or more lists, other records, and so forth.

In one or more embodiments, software component state store 306 is implemented in a file system hierarchy, with different folders being used for different users of computing device 300 and different software components 304. Parts of the file system hierarchy can be associated with private state portion 308, while other parts of the file system hierarchy can be associated with public setting portion 310.

Figure 4:
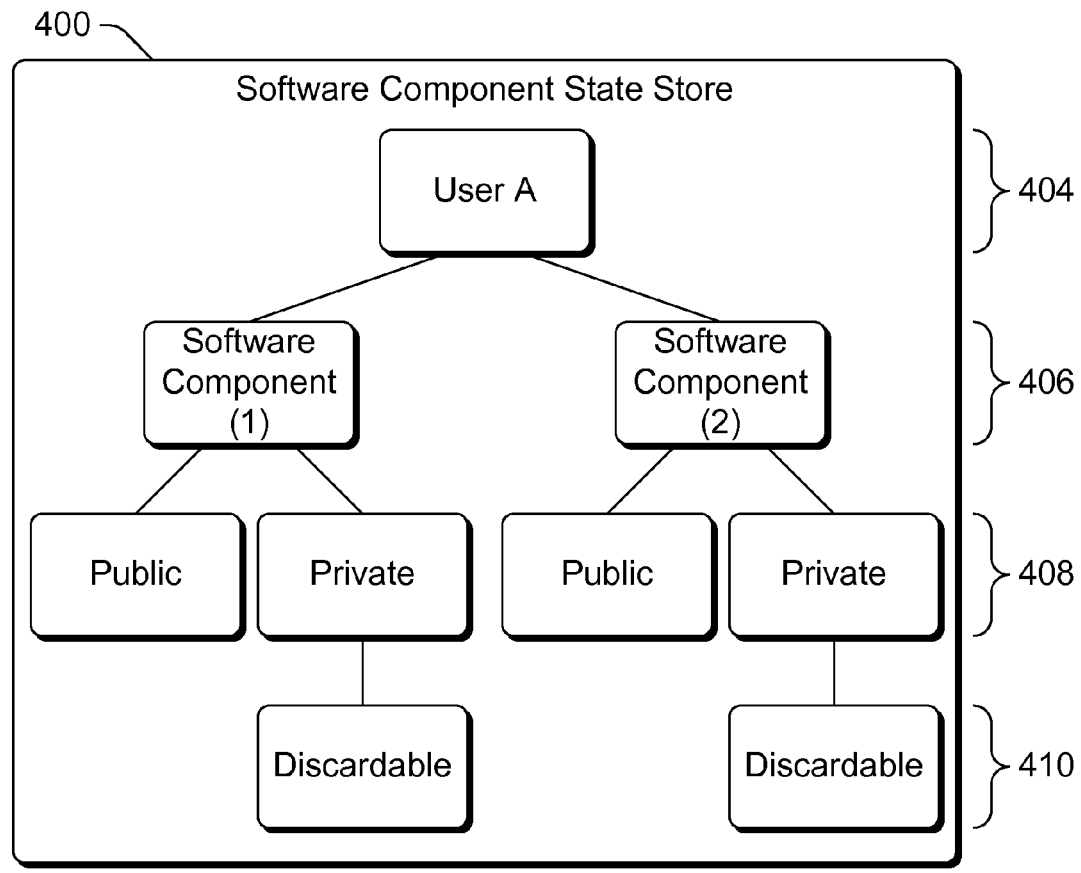
FIG. 4 is a block diagram illustrating an example file system hierarchy for storing software component state in accordance with one or more embodiments.

FIG. 4 is a block diagram illustrating an example file system hierarchy for storing software component settings in accordance with one or more embodiments. FIG. 4 illustrates a software component state store 400, which can be, for example, a store 306 of FIG. 3 or a store 104 of FIG. 1.

As illustrated in FIG. 4, store 400 is organized having a top or first level 404, a second level 406, a third level 408, and a fourth level 410. First level 404 stores directories or folders for users. The particular software components available to different users on a computing device can vary, and the same software components used by different users can have different public settings and/or private state. In the example of FIG. 4, there is a single user (User A), although alternatively top level 404 can include an additional directory or folder for each additional user on the computing device.

Second level 406 stores directories or folders for software components. Settings for different software components are stored in different locations. Each software component has its own sub-directory or sub-folder under a folder in top level 404. In the example of FIG. 4, there are two software components, although alternatively second level 406 can include additional directories or folders for additional software components, or alternatively include a directory or folder for a single software component.

Third level 408 stores directories or folders for public settings and private state. Each software component can have public settings and private state, and separate directories or folders are included in third level 408 to store the public settings and private state. A public sub-directory or sub-folder and a private sub-directory or sub-folder is included under each software component directory or folder in third level 406. One or more files storing public settings for a software component can be included in the public sub-folder under the folder for the software component. A separate file can be included in the public sub-folder for each public setting, or alternatively multiple public settings can be included in a file in the public sub-folder.

Fourth level 410 stores directories or folders for discardable private state. Private state can include discardable state, as discussed above. Information for discardable private state is stored as one or more files in a discardable sub-folder in fourth level 410, while information for other private state is stored as one or more files in a private sub-folder in third level 408.

Returning to FIG. 3, software component setting storage control module 312 obtains one or more public setting declarations 320. Each public setting declaration 320 is a pre-declared setting for software component 304 as discussed above. In one or more embodiments, public setting declarations 320 are provided to control module 312 by an installation component or module when software component 304 is installed on computing device 300. Alternatively, control module 312 can obtain public setting declarations 320 in different manners. For example, public setting declarations 320 can be retrieved by control module 312 from a remote service (e.g., via the Internet or another network), from another local store (a removable or fixed computer storage media) of computing device 300, from another remote service or source, from another computing device, and so forth.

Once obtained, control module 312 enforces the public setting declarations 320. During execution, control module 312 receives requests from software component 304 to access public settings in public setting portion 310. Control module 312 checks the accesses to verify that they conform to the public setting declarations 320. For example, control module 312 verifies that the setting identity and type of an access conform to a setting identity and type declared in a public setting declaration 320.

Control module 312 also exposes an application programming interface (API) 326 allowing software component 304 to request access to the public settings of software component 304. Various different accesses are permitted, such as writing a software value for a public setting, reading the effective value of a public setting, enumerating the public setting schema, removing a previously written software value for a public setting in order to revert the setting's effective value back to the default value for software component 304, and so forth.

In order to request that a software value be written for a public setting, software component 304 provides the name of the setting and the desired value. By writing a software value for a public setting, software component 304 is able to override a default value that was set by the developer as part of the pre-declaration of the setting.

In response to a request that a software value be written for a public setting, control module 312 verifies that the request conforms to the pre-declared format of the setting. This verification includes verifying that the name of the setting that is included in the request has been pre-declared, and verifying that the type of the desired value is the same as has been pre-declared for the setting. If the request conforms to the pre-declared format of the setting, then the request is performed by storing the provided value for the provided name in public setting portion 310. However, if the request does not conform to the pre-declared format of the setting, then the request is denied.

For example, assume software component 304 requests that a particular value be written as the value for a particular setting. If the name of the particular setting is not the name of a setting that has been pre-declared for software component 304, then control module 312 denies the request. If the name of the particular setting matches (is the same as) the name of a setting that has been pre-declared for software component 304 but the setting type is different (e.g., the setting type for the named setting was pre-declared as a Boolean value, but the value attempting to be written is a string value), then control module 312 denies the request. However, if the name of the particular setting matches (is the same as) the name of a setting that has been pre-declared for software component 304, and the setting type matches (is the same as) the setting type that has been pre-declared for that pre-declared setting name, then control module 312 performs the request.

In response to a request that a value be read for a setting, control module 312 verifies that the request conforms to the pre-declared format of the setting. This verification includes verifying that the name of the setting that is included in the request has been pre-declared. If the request conforms to the pre-declared format of the setting, then the request is performed by retrieving, from public setting portion 310, the value for the setting named in the request. When multiple values are stored for the setting named in the request, the particular one of the multiple values that is retrieved can be determined according to various algorithms or rules as discussed in more detail below. However, if the request does not conform to the pre-declared format of the setting, then the request is denied.

It is to be appreciated that, as control module 312 manages access to public setting portion 310, control module 312 can prevent software component 304 from writing incorrect value types for settings as well as inadvertently overwriting a value for another setting. Software component 304 does not directly access public setting portion 310. Rather control module 312 accesses public setting portion 310 in response to requests from software component 304, and writes values to the appropriate locations in public setting portion 310. It should also be noted that this control by module 312 prevents software component 304 from inadvertently overwriting a value for a setting of another software component. For example, public setting values for different software components are by definition maintained in different stores (an example embodiment of which is described above with reference to FIG. 4). Because stores are maintained separately, different software components do not need to be concerned that modifying the software values for their declared settings will modify the software values associated with any other component. Additionally, as discussed above control module 312 can store public settings for different users in different parts of public setting portion 310. The current user of computing device 300 can be determined in a variety of different manners, such as communicating with another component or module to identify a particular user that is currently logged into computing device 300, to identify a particular user that is currently assigned to use a processor of computing device 300, and so forth. Accordingly, different public settings are stored for different users even though the different users may be using the same software component.

In addition, running software component 304 results in what is typically referred to as an instance of software component 304 being created. In one or more embodiments, multiple different instances of software component 304 can be run concurrently for the same current user. For example, requests can be received from a user and/or another component or module to run the same software component 304 multiple times concurrently. In such situations, these multiple different instances share the same part of public setting portion 310. Accordingly, a setting value written to public setting portion 310 by one instance of software component 304 (via control module 312) can subsequently be read by other instances of software component 304 (via control module 312). Similarly, these multiple different instances also share the same part of private state portion 306.

For example, assume software component 304 provides scratchpad functionality, allowing a user to create and save text notes. Different instances of software component 304 share the same public settings, allowing setting changes such as changes of desired languages, font sizes, typefaces, and so forth to be the same for multiple instances of software component 304.

It should be noted that, as discussed herein control module 312 manages access to public settings on a software component basis. Rather than a software product requesting access to public settings, the individual software components that make up the software product request access to public settings. Accordingly, it is to be appreciated that changes made to public settings by a software component when executing as part of one software product can subsequently be retrieved by that software component when executing as part of another software product.

In one or more embodiments, software component setting storage control module 312 maintains multiple different values for the same setting. These different values can be provided by different entities, such as the developer (which provides the default value), the software component 304, an administrator of computing device 300, an administrator of a network that computing device 300 is coupled to, and so forth. These different values are provided to override particular other values, such as an administrator override value to override a default value from a developer, an administrator override value to override a value set by software component 304, and so forth. Administrator override values can also be referred to as policy override values. These different values can be maintained in different manners, such as in different parts of public setting portion 310. For example, a public folder (e.g., in level 408 of FIG. 4) can have multiple sub-folders, each sub-folder corresponding to a different entity. By way of another example, values from software component 304 can be maintained in a public folder (e.g., in level 408 of FIG. 4), whereas values from other entities are maintained in other folders, tables, lists, etc. Control module 312 or another component or module can enforce access rights on such folders, tables, lists, etc., allowing control module 312 to access such folders, tables, lists, etc., but preventing software component 304 from accessing such folders, table, lists, etc.

These different entities can provide their respective values for a setting in a variety of different manners. Default values from the developer can be provided in public setting declarations 320 as discussed above. Values from software component 304 can be included in write requests via API 326. Values from administrators can be included in write requests via API 326, can be provided to control module 312 via another interface, can be stored in a known location (known to both the administrator and control module 312) of store 306 (or another store) by the administrator or another component or module, and so forth.

In one or more embodiments, the entity that is writing or otherwise storing a value is inherently given based on the manner in which the writing or storing occurs. For example, values in public setting declarations 320 are default values from the developer, values received via API 326 are values from software component 304, and so forth. Alternatively, the entity that is writing or otherwise storing a value can be identified in other manners. For example, the entity can provide an identifier of itself prior to making a write request, the entity can provide an identifier of itself as part of the write request, and so forth.

When software component 304 requests to read a value for a setting, software component 304 can identify which of the multiple values for the setting it is requesting. For example, software component 304 can identify that it is requesting the default value, the value set by software component 304, and so forth. In one or more embodiments, software component 304 identifies which of the multiple values for the setting it is requesting by including, in the request, an identifier of which of the multiple values it is requesting. Alternatively, software component 304 can identify which of the multiple values for the setting it is requesting in other manners, such as by invoking different methods of API 326 for different values (e.g., one method to read the default value, another method to read the value previously set by software component 304, and so forth).

In one or more embodiments, software component 304 can identify that it requests to read an "effective value" for a setting. In response to such a request, control module 312 determines the effective value for the setting (assuming the read request is verified as conforming to the pre-declared format of the setting) and returns the effective value to software component 304. The effective value is one of the values stored for the setting, with the particular one being determined according to a particular algorithm or set of rules. This algorithm or set of rules describes which of multiple values has precedence over the other of the multiple values, and thus is the value to be returned in response to requests for a setting value.

In one or more embodiments, control module 312 determines the effective value according to the following rules. If a value for the setting set by an administrator exists, then that value is the effective value. Otherwise, if a value for the setting set by software component 304 exists, then that value is the effective value. Otherwise, the default value is the effective value.

In one or more other embodiments, control module 312 determines the effective value according to the following rules. If an administrator override value to override a value set by software component 304 exists, then that value is the effective value. Otherwise, if a value for the setting set by software component 304 exists, then that value is the effective value. Otherwise, if an administrator override value to override a default value set exists, then that value is the effective value. Otherwise, the default value is the effective value.

Additionally, in one or more embodiments, public settings can be grouped together to form an atomic unit. When multiple public settings are grouped together, control module 312 writes the grouped together settings to public setting portion 310 as a group. Although software component 304 (or different instances thereof) can access read and/or write individual ones of these grouped together public settings if desired, module 312 ensures that they are written to portion 310 as a group.

For example, four values can be used to identify the location of a rectangle to be displayed (e.g., an upper left value in the "x" dimension, an upper left value in the "y" dimension, a lower right value in the "x" dimension, and a lower right value in the "y" dimension). Each of these four values can be a different public setting, and these four public settings can be declared as being grouped together. Accordingly, if control module 312 receives a request from software component 304 to write one or more of these four values, control module 312 writes all four values to portion 310. Control module 312 thus prevents a situation from arising where one instance of a software component writes one of the four values that is stored in public stetting portion 310—a situation that in this example could result in the stored coordinates being nonsensical.

Additionally, in one or more embodiments API 326 exposes one or more methods that allow software component 304 to access its own public settings values. Different methods can be exposed to allow different types of access (e.g., read access, write access, enumerate access, etc.). Table I below describes an example of such methods that can be invoked by software component 304.

TABLE I

| Method | Description |
| --- | --- |
| Read Setting Value | Allows a software component to read the value of a specified setting. The caller specifies as parameters the setting name (e.g., path) and the desired type of value (e.g., the default value, the effective value, etc.). |
| Write Setting Value | Allows a software component to write the value of a specified setting. The caller specifies as parameters the setting name (e.g., path) and the desired type of value (e.g., the default value, the effective value, etc.). |
| Reset Setting Value | Allows a software component to remove any public setting value previously written by the component. The caller specifies as parameters the setting name (e.g., path) for which the setting value is to be removed. |

TABLE I-continued

| Method | Description |
| --- | --- |
| Enumerate Settings | Allows a software component to enumerate the settings for a specific setting name (e.g., path). The caller specifies as parameters a setting name (e.g., path) or an empty string to indicate all the public settings for the software component. Information about each setting of the specified setting name (or all the public settings for the software component) are returned. |
| Get State Directory | Returns the location (e.g., folder pathname) of a private state portion. The caller specifies the type of state directory (e.g., discardable or not discardable). If the folder does not yet exist in the software component state store, the folder is created before the location is returned to the caller. |
| Reset State | Resets the settings and optionally other state for a specified software component. The caller can specify which settings or other state to reset (e.g., only the discardable state, all state, etc.), as discussed in more detail below. |

Figure 5:
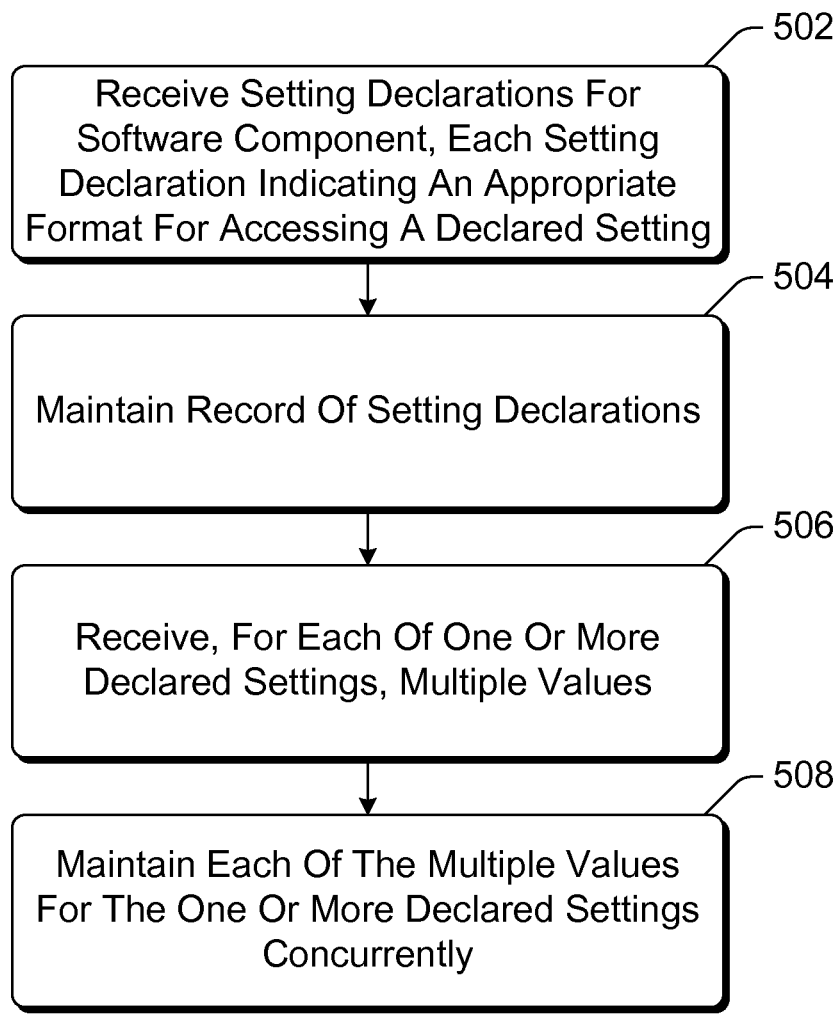
FIG. 5 is a flowchart illustrating an example process for a device controlling access to software component setting values in accordance with one or more embodiments.

FIG. 5 is a flowchart illustrating an example process 500 for a device controlling access to software component setting values in accordance with one or more embodiments. Process 500 is carried out by a device, such as computing device 100 of FIG. 1 or computing device 300 of FIG. 3, and can be implemented in software, firmware, hardware, or combinations thereof. Process 500 is an example process for controlling access to software component settings; additional discussions of controlling access to software component settings are included herein with reference to different figures.

In process 500, one or more setting declarations for a software component are received (act 502). Each setting declaration indicates an appropriate format for accessing a declared setting. The setting declarations can be received in a variety of different manners as discussed above.

An immutable record of the setting declarations is maintained (act 504). Maintaining this record allows, for example, subsequent verification that access to the declared setting conforms to the appropriate format. This maintaining can be, for example, storing a manifest that is received in act 502 and/or storing the settings including default values obtained from a manifest that is received in act 502. Executing software component implementations are unable to modify the settings schema as this information is an immutable part of a software component's published manifest contract.

For each of one or more of the declared settings, multiple values are received (act 506). These multiple values can include values from a variety of different entities, and so forth as discussed above.

Each of the received multiple values is maintained concurrently (act 508). As each of the multiple values is stored, different ones of the multiple values can be returned in response to different requests as discussed above.

Figure 6:
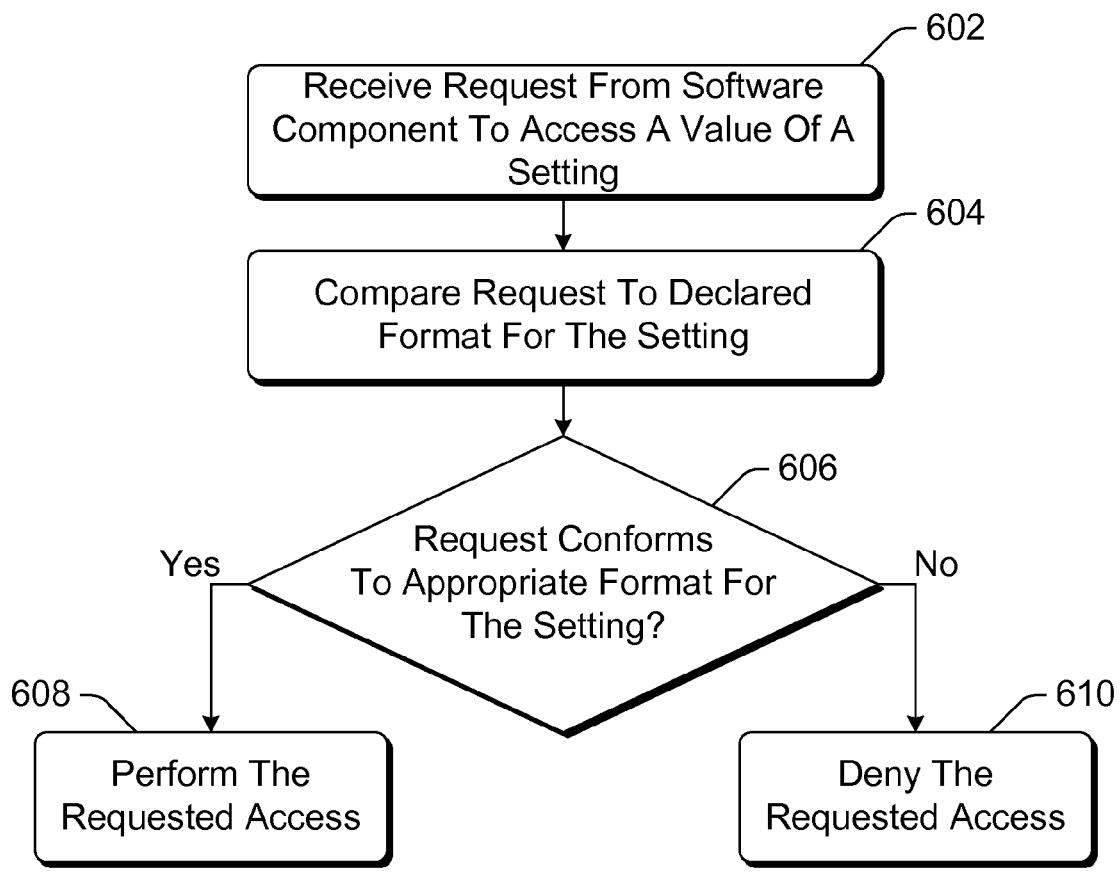
FIG. 6 is a flowchart illustrating another example process for a device controlling access to software component setting values in accordance with one or more embodiments.

FIG. 6 is a flowchart illustrating an example process 600 for a device controlling access to software component setting values in accordance with one or more embodiments. Process 600 is carried out by a device, such as computing device 100 of FIG. 1 or computing device 300 of FIG. 3, and can be implemented in software, firmware, hardware, or combinations thereof. Process 600 is an example process for controlling access to software component settings; additional discussions of controlling access to software component settings are included herein with reference to different figures.

In process 600, a request to access a value of a setting is received from a software component (act 602). This request can be received, for example, via an API exposed by a software component setting storage control module as discussed above.

The request is compared to a declared format for the setting (act 604), and a check is made as to whether the request conforms to the appropriate format for the setting (act 606). This check can include various operations, such as checking a setting name, a setting type, whether atomicity is maintained, and so forth as discussed above.

If the request conforms to the appropriate format for the setting, then the requested access is performed (act 608). However, if the request does not conform to the appropriate format for the setting, then the requested access is denied (act 610) and thus is not performed.

The controlling access to software component state techniques discussed herein provide control over public setting for software components, helping prevent the inadvertent overwriting of setting values as well as providing a more consistent settings model for developers to leverage. Additionally, the controlling access to software component state techniques discussed herein provide for various usage scenarios.

In one or more embodiments, the controlling access to software component state allows for multiple levels of reset for a software component. Different reset levels can be employed, each changing the private state and/or public settings for the software component. For example one reset level can delete all state in the discardable state portion of the private state portion, but leave the remaining part of the private state portion and the public settings portion unchanged. After such a reset, the values of the software component maintained in the private state portion (other than in the discardable state portion) and the public settings portion would still be accessible to the software component. By way of another example, another reset level can delete all of the state in the private state portion (regardless of whether the information is in the discardable state portion), but leave the public settings portion unchanged. After such a reset, the settings of the software component maintained in the public setting portion would still be accessible to the software component. By way of yet another example, yet another reset level can delete all of the values set by the software component, effectively returning the settings of the software component to their default levels (the default values provided in the public setting declarations). After such a reset, the default values of the software component would still be accessible to the software component.

Additionally, the controlling access to software component state allows a software component to be upgraded to a new version while maintaining previous private state and public setting values. As discussed above, the version number can include a contract version number and a servicing version number. In one or more embodiments, the software component setting storage control module identifies software components having the same contract version number to be the same software components, even if the servicing version numbers are different. However, the software component setting storage control module identifies software components having different contract version numbers as different software components. Accordingly, a developer can release a new version of a software component with the same contract version number but new servicing version number, and still have the software component access the private state and public setting values stored by the previous version of the software component.

Furthermore, in one or more embodiments the controlling access to software component state facilitates migration of a software component. This migration can refer to the transferring of a software component from one computing device to another, or the changing of the operating system being used by the computing device on which the software component is installed. Regardless of the type of migration, the public setting and private state values for the software component are maintained in particular portions of the software component setting store. These particular portions are known, and this knowledge can be leveraged during migration to allow the public setting and private state values to be migrated along with the software component (to a different computing device and/or different operating system).

Figure 7:
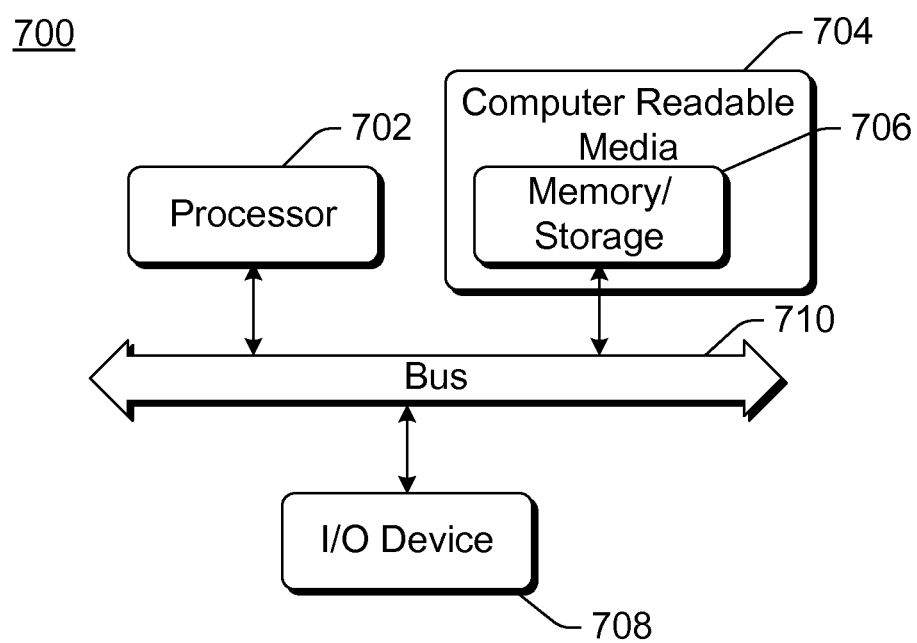
FIG. 7 illustrates an example computing device that can be configured to implement the controlling access to software component state in accordance with one or more embodiments.

FIG. 7 illustrates an example computing device 700 that can be configured to implement the controlling access to software component state in accordance with one or more embodiments. Computing device 700 can be, for example, computing device 100 of FIG. 1 or computing device 300 of FIG. 3.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or nonvolatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other device which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, although can alternatively also incorporate firmware and/or hardware. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the controlling access to software component state techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more processors of a device, the method comprising:
　receiving a setting declaration for state information for a software component;
　storing the state information in a discardable portion of a component state store;
　accessing the stored state information by the software component;
　responsive to receiving a command to delete the information in the discardable portion of the component state store, deleting the state information; and
　maintaining continued operation of the software component after the discardable portion is deleted.

2. The method as recited in claim 1 further comprising using, by the software component, the discardable portion as a performance cache by the software component.

3. The method as recited in claim 1 further comprising: obtaining, by the software component, information from one or more other software components; and using the discardable portion to store the information from the one or more other software components.

4. The method of claim 1, wherein said accessing comprises directly accessing the discardable portion at a location provided by an operating system.

5. The method of claim 1, wherein said accessing comprises accessing the discardable portion via one or more application programming interface (API) methods exposed by operating system.

6. A computer-implemented method comprising:
　providing a software component state store with multiple portions, each portion corresponding to a different one of multiple reset levels for an associated software component;
　storing settings of state information in one or more of the portions;
　receiving a request to reset the state of the software component, the request containing a reset level;
　choosing, based on the reset level, which portion of the software component state store to delete; and
　deleting the chosen portion.

7. The method of claim 6, wherein the multiple portions comprise:
　a public setting portion;
　a private state portion; and
　a discardable state portion.

8. The method of claim 7 wherein the deleting comprises deleting the discardable state portion corresponding to the lowest level of reset.

9. The method of claim 8, wherein deleting the discardable portion leaves values stored in the remainder of the private state portion and in the public settings portion accessible to the software component.

10. The method of claim 7, wherein the deleting comprises deleting the discardable state portion, the private state portion and the public setting portion corresponding to the highest level of reset.

11. The method of claim 10, wherein the deleting the discardable state portion, the private state portion and the public setting portion returns the software component to a default state.

12. The method of claim 6, wherein said storing comprises directly accessing the one or more portions at a location provided by an operating system.

13. The method of claim 6, wherein said storing comprises accessing the one or more portions via one or more application programming interface (API) methods exposed by an operating system.

14. One or more computer storage memories having stored thereon multiple instructions that, when executed by one or more processors of a device, cause the one or more processors to:
　install a software component of a software product on the device;
　receive a request from the software component to store a value of a setting of the software component;
　store the value from the software component of the setting in one of a public setting portion or a private state portion of a software component state store; and
　receive an upgrade to be installed for the software component, while maintaining the values stored in the software component state store.

15. The one or more computer storage memories of claim 14, the instructions further executable to:

compare version numbers, comprising a contract version number and a servicing version number, supplied with the upgrade to version numbers of the software component;

responsive to the contract version number of the software component and the upgrade matching:
install the upgrade; and
maintain the public settings and private state of the software component for use by the upgraded software component.

16. The one or more computer storage memories of claim 14, the instructions further executable to:
responsive to the contract version number of the software component and the upgrade not matching:
install the upgrade as a new software component; and
create a new software component state store for the new software component.

17. The one or more computer storage memories of claim 16, wherein the new software component state store comprises a public setting portion, a private state portion and a discardable state portion within the private state portion.

18. The one or more computer storage memories of claim 17, wherein the software component accesses the private state portion directly at a location provided by an operating system.

19. The one or more computer storage memories of claim 17, wherein the software component accesses the private state portion via one or more application programming interface (API) methods exposed by the operating system.

20. The one or more computer storage media of claim 15, wherein the software component can be shared by one or more software products.

* * * * *